(12) United States Patent
Tamon et al.

(10) Patent No.: US 10,576,651 B2
(45) Date of Patent: Mar. 3, 2020

(54) METHOD OF CUTTING BRITTLE MATERIAL, DEVICE FOR CUTTING BRITTLE MATERIAL, METHOD OF MANUFACTURING CUT BRITTLE MATERIAL AND CUT BRITTLE MATERIAL

(71) Applicant: Central Glass Company, Ltd., Ube, Yamaguchi (JP)

(72) Inventors: Hiroyuki Tamon, Matsusaka (JP); Hideaki Oota, Matsusaka (JP); Naoya Hayakawa, Matsusaka (JP)

(73) Assignee: Central Glass Co., Ltd., Ube (JP)

( * ) Notice: Subject to any disclaimer, the term of this patent is extended or adjusted under 35 U.S.C. 154(b) by 0 days.

(21) Appl. No.: 15/540,408

(22) PCT Filed: Jan. 22, 2016

(86) PCT No.: PCT/JP2016/051876
§ 371 (c)(1),
(2) Date: Jun. 28, 2017

(87) PCT Pub. No.: WO2016/125609
PCT Pub. Date: Aug. 11, 2016

(65) Prior Publication Data
US 2017/0361486 A1    Dec. 21, 2017

(30) Foreign Application Priority Data

Feb. 3, 2015  (JP) .................................. 2015-019022
Mar. 17, 2015  (JP) .................................. 2015-053507

(51) Int. Cl.
*B26F 3/16*       (2006.01)
*B28D 1/22*       (2006.01)
(Continued)

(52) U.S. Cl.
CPC ............. *B26F 3/16* (2013.01); *B28D 1/221* (2013.01); *B28D 1/225* (2013.01); *B28D 1/226* (2013.01);
(Continued)

(58) Field of Classification Search
CPC . Y10T 225/10; Y10T 225/30; Y10T 225/304; B26F 3/16; B26F 3/06;
(Continued)

(56) References Cited

U.S. PATENT DOCUMENTS 3,453,097 A  *  7/1969  Hafner .................... C03B 23/20
                                                          65/112
4,467,168 A  *  8/1984  Morgan ................ C03B 33/082
                                                          219/121.67
(Continued)

FOREIGN PATENT DOCUMENTS

JP        47-5385 A       3/1972
JP        47-5385 U       9/1972
(Continued)

OTHER PUBLICATIONS

International Search Report (PCT/ISA/210) issued in PCT Application No. PCT/JP2016/051876 dated Mar. 29, 2016 with English translation (six pages).
(Continued)

*Primary Examiner* — Phong H Nguyen
(74) *Attorney, Agent, or Firm* — Crowell & Moring LLP

(57) ABSTRACT

Provided are a method of full body cutting a brittle material without via the bend-breaking step, an apparatus of cutting a brittle material, a method of manufacturing a brittle material, and a cut brittle material. A method of cutting a brittle material, the method comprising: a conveyance cutting step of converging and irradiating an infrared ray to the brittle material linearly along a line using an infrared line
(Continued)

heater while moving the infrared line heater relative to the brittle material in a direction along the line, thereby cutting the brittle material along the line.

4 Claims, 15 Drawing Sheets

(51) Int. Cl.
   *C03B 33/09* (2006.01)
   *B28D 7/02* (2006.01)
(52) U.S. Cl.
   CPC .............. *B28D 7/02* (2013.01); *C03B 33/09* (2013.01); *Y10T 225/30* (2015.04); *Y10T 225/304* (2015.04)
(58) Field of Classification Search
   CPC ........... B26F 3/08; B28D 1/221; B28D 1/225; C03B 33/09
   See application file for complete search history.

(56) References Cited

U.S. PATENT DOCUMENTS

| | | | | |
|---|---|---|---|---|
| 5,084,604 | A * | 1/1992 | Dekker | B26F 3/06 219/121.67 |
| 5,826,772 | A * | 10/1998 | Ariglio | B23K 26/0736 225/2 |
| 2006/0022008 | A1 * | 2/2006 | Brown | B23K 26/06 225/1 |
| 2007/0062921 | A1 | 3/2007 | Karube et al. | |
| 2007/0228100 | A1 * | 10/2007 | Gonoe | B23K 26/0736 225/1 |

FOREIGN PATENT DOCUMENTS

| | | |
|---|---|---|
| JP | 49-10208 A | 1/1974 |
| JP | 49-73411 A | 7/1974 |
| JP | S54-106524 | 8/1979 |
| JP | 11-157863 A | 6/1999 |
| JP | 2002-100292 A | 4/2002 |
| JP | 2002-110589 | 4/2002 |
| JP | 2003-34545 A | 2/2003 |
| JP | 2004-155159 | 6/2004 |
| JP | 2005-112683 A | 4/2005 |
| JP | 4179314 B2 | 11/2008 |
| JP | 2010-253752 A | 11/2010 |
| JP | 2011-116611 A | 6/2011 |
| JP | 2011-144092 A | 7/2011 |
| JP | 2012-6795 A | 1/2012 |

OTHER PUBLICATIONS

Japanese-language Written Opinion (PCT/ISA/237) issued in PCT Application No. PCT/JP2016/051876 dated Mar. 29, 2016 (five pages).
Japanese-language Office Action issued in Application No. 2016-573281 dated Feb. 27, 2018 (three (3) pages).
Japanese-language Office Action issued in counterpart Japanese Application No. 2016-573281 dated Sep. 11, 2018 (four (4) pages).
Notification of Reasons for Refusal issued in JP Patent Application No. JP-2018-230620, dated Jan. 8, 2020, with English translation (7 pages).

\* cited by examiner

← GLASS FRONT SURFACE

← GLASS BACK SURFACE

← GLASS FRONT SURFACE

← GLASS BACK SURFACE

TENSILE STRESS

COMPRESSIVE STRESS

METHOD OF CUTTING BRITTLE MATERIAL, DEVICE FOR CUTTING BRITTLE MATERIAL, METHOD OF MANUFACTURING CUT BRITTLE MATERIAL AND CUT BRITTLE MATERIAL

TECHNICAL FIELD

The present invention relates to a method of cutting a brittle material, an apparatus for cutting a brittle material, a method of manufacturing a cut brittle material, and a cut brittle material.

BACKGROUND ART

As a method of dividing a brittle material, for example, a large glass plate, into a smaller size, a method may be used involving introducing a scribe line (notch) on the surface along an intended cut line (a line along which glass will be cut) with a superhard tool blade such as tungsten carbide and polycrystalline diamond.

In this method, a glass plate is bend-broken in a mechanical manner by applying bending stress in a direction orthogonal to the scribe line (bend-breaking).

However, in the mechanical cutting approach as described above, glass plates may be brought into contact with each other upon bend-breaking to produce small fragmented pieces called "cuttings." This may contaminate the surfaces and cut surfaces of cut glass plates. Further, countless minute notches called "microcracks" may be created on the cut surfaces due to bend-breaking, resulting in a decreased mechanical strength of the cut glass plates.

Further, uniform application of bending stress over an intended cut line is difficult for a thick glass plate which is mainly used in buildings and the like (for example, a glass plate with a plate thickness of 15 mm or more) upon bend-breaking, often resulting in cut-end defects described in JIS R3202 such as "splinters," "horned projection," "chipped cut-end," "shell-like chipping," "deviation from cut line."

For these reasons, the thermal stress cutting process has also been used in recent years, including the full-body cutting process (which means that a material is divided into two. "Divided into two" means that a material is divided into two fragments with respect to one intended cut line.) by laser beam irradiation.

It is said that the laser beam irradiation can avoid defects characteristic of the conventional mechanical cutting process such as contaminated cut glass plates due to production of "cuttings" upon cutting and decreased glass strength due to development of "microcracks," and thus can generally provide cut surfaces with higher strength as compared with those by the mechanical cutting process.

Patent Document 1 describes a technology for full-body cutting of a brittle material by using wavelength-tunable laser. According to the above technology, a laser beam is allowed to be absorbed throughout the entire plate thickness from the front surface through the back surface of a cutting target, depending on the absorbing characteristics of the cutting target at the wavelength of the laser-beam.

The wavelength of the laser-beam suitably selected for cutting at that time enables full-body cutting of a brittle material with a scribe depth in the direction of the entire plate thickness of the cutting target without the need of the bend-breaking step.

Further, Patent Document 2 discloses a method in which a laminated glass is irradiated with a near-infrared ray linearly to cut the laminated glass.

Patent Document 1: Japanese Patent No. 4179314
Patent Document 2: Japanese Unexamined Patent Application, Publication No. 2005-112683

DISCLOSURE OF THE INVENTION

Problems to be Solved by the Invention

According to Patent Document 1, a laser output required for cutting a 2.8 mm alkali-free glass is 200 W. However, a thicker glass plate requires a laser with a higher power of more than 200 W, but such a laser is difficult to be prepared from a technological perspective.

The technology described in Patent Document 2 can not be considered as full body cutting because shear force is applied to a region of an intended cut line where the strength has been decreased by emitting a near infrared ray in linearly to the intended cut line, thereby cutting a glass plate. Therefore, glass plates may be brought into contact with each other upon bend-breaking, resulting in occurrence of "cuttings" and "microcracks." Further, only a portion corresponding to a length irradiated with an infrared ray emitted from an infrared heater can be cut.

An object of the present invention is to provide a method of full body cutting a brittle material without via the bend-breaking step, an apparatus of cutting a brittle material, a method of manufacturing a brittle material, and a cut brittle material.

Means for Solving the Problems

In the process of studying heat treatment of a brittle material with an near-infrared line heater which emits a light in a wavelength band transmittable through the brittle material to some extent and can easily be powered-up as compared with laser, the present inventors found that full body cutting can be achieved without performing the step of bend-breaking a brittle material when a near-infrared ray is converged linearly along a line on the brittle material to heat an intended cut surface with a near-infrared ray transmitted through the brittle material.

Further, the present inventors found that a crack of the brittle material can be advanced and a long plate-like brittle material can be cut with a near-infrared line heater which has a length shorter than that of an intended cut line by relatively moving the near-infrared line heater along the intended cut line while converging and irradiation on the brittle material with a near-infrared ray.

A first aspect of the present invention can provide a method of cutting a brittle material, the method comprising a conveyance cutting step of converging and irradiating an infrared ray to the brittle material linearly along a line using an infrared line heater while moving the infrared line heater relative to the brittle material in a direction along the line, thereby cutting the brittle material along the line.

In the above method of cutting, the conveyance cutting step may comprise a cooling step of decreasing the temperature of a surface of a terminal region for cutting in the brittle material when cutting the terminal region.

In the above method of cutting, the brittle material may absorb the infrared ray to undergo heat crack.

In the above method of cutting, the brittle material may be a glass plate or an alumina substrate. The above method may include, before the conveyance cutting step, a notching step of notching the brittle material at a starting end region for the cutting of the brittle material along the line on the brittle material.

The above method of cutting may include before performing the conveyance cutting step, an initial crack-inducing step of converging and irradiating the infrared ray to the brittle material linearly along a line at a speed slower than the first speed in the direction along the line or after stopping the brittle material.

The above method of cutting may include, after the conveyance cutting step, a terminal crack-inducing step of converging and irradiating the infrared ray to the brittle material linearly along a line at a speed slower than the first speed in the direction along the line or after stopping the brittle material.

A second aspect of the present invention can provide an apparatus of cutting a brittle material comprising a mounting stage on which a brittle material is to be placed; an infrared line heater for converging and irradiating an infrared ray to the brittle material linearly along a line; and a transport mechanism for transporting the infrared line heater relative to the mounting stage.

The above cutting apparatus may include a fluid jetting device for jetting a fluid over the brittle material. The above cutting apparatus may include a control unit for controlling the fluid jetting device, wherein the control unit allows the fluid to jet against a terminal region for cutting of the brittle material when cutting the terminal region.

A third aspect of the present invention can provide a method of manufacturing a cut brittle material, the method comprising a conveyance cutting step of converging and irradiating an infrared ray to a brittle material linearly along a line using an infrared line heater while moving the infrared line heater relative to the brittle material in a direction along the line, thereby cutting the brittle material along the line.

A fourth aspect of the present invention can provide a brittle material cut in a conveyance cutting step of converging and irradiating an infrared ray to a brittle material linearly along a line using an infrared line heater while moving the infrared line heater relative to the brittle material in a direction along the line, thereby cutting the brittle material along the line.

Effects of the Invention

The present invention can provide a method enabling full body cutting of a brittle material without performing the bend-breaking step, an apparatus of cutting a brittle material, a method of manufacturing a cut brittle material which is full body cut without via the bend-breaking step, and a cut brittle material.

PREFERRED MODE FOR CARRYING OUT THE INVENTION

First Embodiment

Below, the first embodiment of the present invention will be described.

The present invention can provide a method of cutting a brittle material, the method including a conveyance cutting step of converging (focusing, collecting) and irradiating an infrared ray to the brittle material linearly along a line using an infrared line heater while moving the infrared line heater relative to the brittle material in a direction along the line, thereby cutting the brittle material along the line.

In the first embodiment, described is a glass cutting apparatus 1 for cutting a plate-like glass 2 in which an infrared line heater 2 is moved relative to the glass 2 which remains stationary, the plate-like glass 2 being a brittle material capable of absorbing an infrared ray to undergo heat crack.

Figure 1:
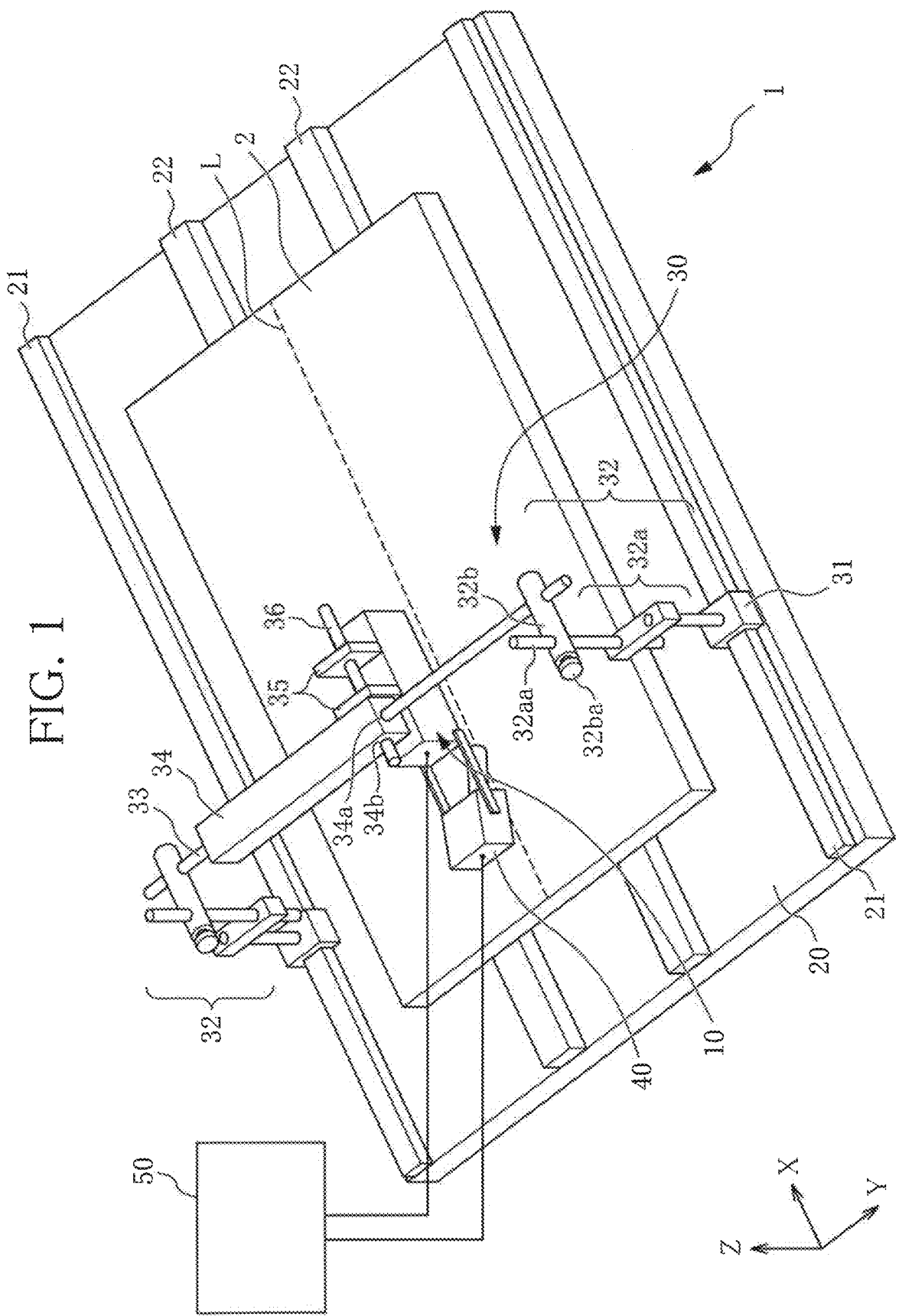
FIG. 1 shows a schematic view of a glass cutting apparatus with a glass plate in place.

FIG. 1 shows a schematic view of the glass cutting device 1 with the glass 2 in place.

Figure 2:
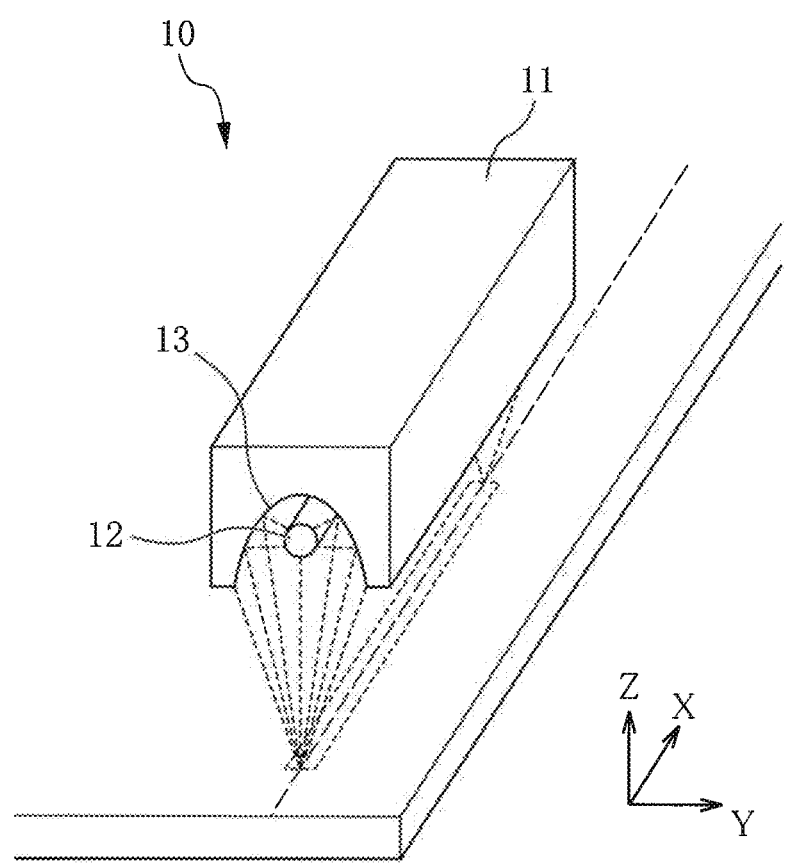
FIG. 2 illustrates an infrared line heater in the glass cutting apparatus.

FIG. 2 illustrates an infrared line heater 10 of the glass cutting device 1.

For descriptions below, the conveyance direction of the infrared line heater 10 is designated as the X direction, and the horizontal direction perpendicular to the X direction is designated as the Y direction, and the thickness direction of the glass 2 is designated as the Z direction.

(Definitions of Terms)

Below, terms used herein will be described.

As used herein, the term "full body cutting" refers to divide an article into two. The phase "dividing into two" refers to dividing an article into two with respect to one intended cut line L.

As used herein, the term "intended cut line" refers to a line L along which the glass 2 is to be cut, as shown in FIG. 1. Further, the term "on the intended cut line" refers to being within a plane parallel to the thickness direction of a glass plate among planes including the intended cut line L. The term "plane parallel to the thickness direction of a glass plate" will form a cut surface after cutting.

As used herein, the term "non-contact cutting" refers to a cutting performed without applying artificial external force except for heating unlike a cutting performed by applying force to a glass plate through contact with a device or a hand, for example, as in the conventional bend-breaking step.

(Description of Apparatus)

As shown in FIG. 1, the glass cutting device 1 includes a fixing platform 20, conveyance rails 21 attached to the fixing platform 20, a portal frame 30 capable of moving along the conveyance rails 21, an infrared line heater 10 supported by the flame 30, and a control unit 50 for performing ON/OFF of the infrared line heater 10.

Further, the glass cutting device 1 according to the present embodiment includes a gas jetting device 40 capable of moving along with the infrared line heater 10.

(Fixing Platform 20)

The fixing platform 20 is a rectangular plate member, and is supported at a height where a worker can work comfortably.

The conveyance rails 21, which extend in the X direction, are each attached to the corresponding side portion in the Y direction on the surface of the fixing platform 20.

Further, two mounting stages 22, which extend along the X direction, are arranged between the conveyance rails 21 at the side portions on the surface of the fixing platform 20.

It is noted that the mounting stages 22 are provided in the present embodiment, but the configuration is not limited to this. A configuration without the mounting stages 22 may be used. However, provision of the mounting stages 22 can allow the back surface of the glass 2 mounted on the mounting stages 22 to be exposed to air. This exposure to air can promote a temperature gradient from the front surface of the glass 2 to the back surface as described below, allowing for better cutting.

Further, a material with poor heat conductivity is preferably used immediately beneath the intended cut line L at the mounting stages 22. When the glass 2 is heated with infrared light, the temperatures of the front surface, back surface, and inside of the glass are increased. If a material with good heat conductivity makes contact with the back surface of the glass 2, heat tends to escape from the glass, resulting in a decreased rate of extension of a crack 2a. As a convenient way, a portion immediately beneath the intended cut line L is preferably exposed to air. To this end, the fixing platform 20 may be segmentalized, or may be configured so that the glass 2 is supported with multiple pin-like members from therebelow.

(Flame 30)

The flame 30 includes first sliders 31 each movably attached to the corresponding conveyance rail 21, and lifting and lowering mechanisms 32 extending upwardly from the first sliders 31.

The lifting and lowering mechanism 32 includes a rod assembly 32a fixed to the first slider 31, and a connector 32b inserted into the rod assembly 32a. A rod 32aa of the rod assembly 32a is inserted into a first hole provided in the connector 32b. The connector 32b can be moved in the vertical direction along the rod 32aa when a screw 32ba provided in the connector 32b is loosened, and the connector 32b is fixed to the rod 32aa when the screw 32ba is tightened.

A suspension rod 33 spans the lifting and lowering mechanisms 32 at the both sides.

The suspension rod 33 is inserted into holes provided in the connectors 32b at the both sides to span the lifting and lowering mechanisms 32.

A second slider 34 capable of moving in the Y direction relative to the suspension rod 33 is inserted into the suspension rod 33. The second slider 34 is in a form of a square bar, and includes a first through-hole 34a extending in the Y direction. The aforementioned suspension rod 33 is inserted into the above first through-hole 34a. Further, the second slider 34 includes a second through-hole 34b below the first through-hole 34a, the second through-hole 34b extending in the direction orthogonal to the first through-hole 34a in a skew manner.

A heater supporting rod 36 is inserted into the second through-hole 34b, the heater supporting rod 36 penetrating through a heater supporting plate 35 fixed to the infrared line heater 10.

Two of the heater supporting plate 35 are provided such that they are fixed to the upper part of the infrared line heater 10 in a mutually parallel fashion.

(Infrared Line Heater 10)

As shown in FIG. 2, the infrared line heater 10 includes a housing 11, an infrared lamp 12 arranged in the housing 11, and a light-converging part 13 arranged around the outer periphery of the infrared lamp 12. An on/off operation is directed by a control unit 50.

The housing 11 is a rectangular box, and has an opening in the lower surface. The infrared lamp 12 and the light-converging part 13 are secured inside the housing 11.

(Infrared Lamp 12)

Examples of an infrared ray generated by the infrared lamp 12 include a near-infrared ray, a mid-infrared infrared ray, a far-infrared ray, and the like, but a near-infrared ray having an infrared peak wavelength in a range of 780 nm to 2500 nm is preferred.

This is because soda lime silicate glass, a glass plate of which is used for construction, has a transmittance of about 30 to 85% in the near-infrared region, showing higher transmittancy and absorbability than in other infrared regions.

That is, when a near-infrared ray is used, the near-infrared ray can be absorbed in the thickness direction of the glass 2 throughout the entire plate thickness from the front surface to the back surface of the glass. This enables effective and quick heating of the glass surfaces for cutting.

Consequently, a suitable temperature distribution in the direction of the entire plate thickness of the glass 2 can be achieved over the plate width. This can provide cut surfaces without a defect at the cut ends.

(Light-converging Part 13)

The light-converging part 13 may be, for example, a reflecting mirror.

The reflecting mirror is a concave mirror in which a rectangular sheet member is bent.

The infrared lamp 12 is positioned at a first focus of the ellipse, and the longer axis of the ellipse (which coincides with a line segment through the two focal points) coincides with the irradiation axis of the infrared ray emitted from the infrared lamp 12.

In order to efficiently converging the infrared light emitted from the infrared lamp 12, the length of the reflecting mirror is preferably longer than the infrared lamp 12. Further, a gold-plated surface of the reflecting mirror can improve the reflectance, allowing for more efficient convergence of infrared light.

It is noted that the light-converging part 13 is not limited to a reflecting mirror, but various lenses such as cylindrical lenses may be used. When a cylindrical lens is used, it may be arranged between the infrared lamp 12 and the glass 2.

Further, when an infrared ray is converged with the light-converging part 13, the light-convergence width at the focal point is preferably narrow in order to increase the precision of full body cutting. In the present embodiment, the light-convergence width is 3 mm. Moreover, the light-convergence width may be narrowed with a light-shielding slit (not shown).

Returning to FIG. 1, the upper part of the infrared line heater 10 is fixed to the two heater supporting plates 35, and the two heater supporting plates 25 are supported by the heater supporting rod 36 as described above. The heater supporting rod 36 is supported by the second slider 34, and the second slider 34 is supported by the suspension rod 33, and the suspension rod 33 is supported by the connectors 32b.

Therefore, the infrared line heater 10 moves up or down along with the suspension rod 33 when the connectors 32b moves up or down along the rods 32aa of the rod assemblies 32a.

This enables the infrared line heater 10 to move up or down d relative to the fixing platform 20, i.e., relative to the glass 2.

As described above, the infrared line heater 10 configured to move up or down relative to the glass 2 can allow the light from the infrared lamp 12 to be converged onto the surface of the glass 2 in an appropriate width even when the glass 2 has a different thickness.

(Gas Jetting Device 40)

In the present embodiment, the gas jetting device 40 is attached at the negative X side of the infrared line heater 10, i.e., the rear side in the direction of movement.

The gas jetting device 40 is a device for jetting compressed air through a nozzle, and is attached such that compressed air can be jetted over the intended cut line L heated with the infrared line heater 10.

It is noted that in the present embodiment, the gas jetting device 40 is attached to the infrared line heater 10, and can be operated through the control unit 50 as in the case of the infrared line heater 10.

However, the gas jetting device 40 does not need to be attached to the infrared line heater 10, nor need to be operated through the control unit 50 shared with the infrared line heater 10.

For example, an operator may hold the gas jetting device 40 in hand or in other manners, and may operate the gas jetting device 40 independently of the infrared line heater 10.

Further, the gas jetting device 40 jets compressed air in the present embodiment, but the gas is not limited to this. The device may jet non-comprehend air or other gases. Moreover, there is no particular limitation for the gas jetting device 40 as long as it can decrease the temperature of the surface of the glass 2. For example, water, mist, and the like may be used.

(Glass 2)

The brittle material to be cut with the present cutting device is a plate-like glass 2.

There is no particular limitation for the material of the glass 2 as long as it can absorb infrared light. The examples thereof include soda lime glass, quartz glass, borosilicate glass, aluminosilicate glass, and the like. It is noted that in addition to the aforementioned types of glass, any materials can be cut as in glass as long as they undergo heat crack. Examples thereof include plates made of ceramic materials such as alumina plates.

The glass 2 to be cut in the present embodiment is a plate-like glass 2 with a thickness of 2 mm or more and 25 or less which is used as a common structural glass plate (for example, the glass plate described in JIS R3202). However, it is not limited to that thickness.

Further, a laminated glass product in which two or more of the glass 2 are laminated can be cut as long as the glass 2 can be heated.

Further, an infrared absorption layer may be formed on the intended cut line L on the surface of the glass 2 to increase the light-converging efficiency. The infrared absorption layer is preferably narrower than the light-convergence width, and may be conveniently drawn as a line with, for example, a black pen and the like.

(Arrangement of Infrared Line Heater 10)

In the present embodiment, the infrared line heater 10 of the glass cutting device 1 will cut the glass 2 at the mid-portion in the Y direction of the glass 2 as shown in FIG. 1 as an intended cut line L.

However, the arrangement is not limited to this, and it can be used for an edge cutting process of glass. The term "edge cutting" refers to cutting of an edge portion of the glass 2, and commonly performed for increasing the quality in the manufacturing process.

(Method of Cutting)

Next, operations of the glass cutting device 1 will be described.

FIG. 3A to 3D illustrates a cutting process depicting the cutting process in time series.

First, the glass 2 to be cut is placed on the mounting stages 22.

Then, the infrared line heater 10 is moved so that the irradiation region of the infrared line heater 10 includes the end portion in the negative X side of the glass 2.

The position of the infrared line heater 10 in the height direction is adjusted depending on the thickness of the glass 2 by raising or lowing the connectors 32b along the rods 32aa so that the width of an infrared ray emitted from the infrared line heater 10 becomes a desired width (3 mm in the present embodiment).

Figure 3A:
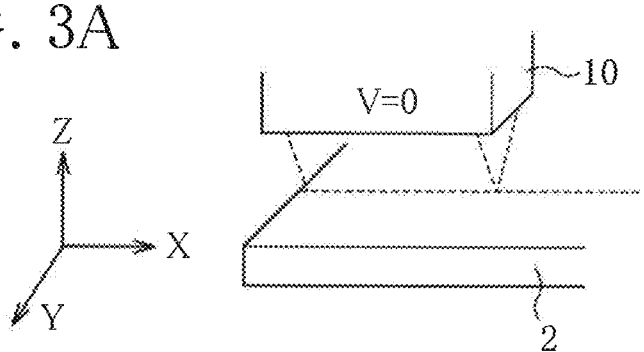
FIG. 3A illustrates a method of cutting a glass plate depicting the cutting process in time series.

The infrared line heater 10 is turned ON. At this time, in the present embodiment the infrared line heater 10 is not yet conveyed but remains standing still (V=0) (FIG. 3A).

Figure 3B:
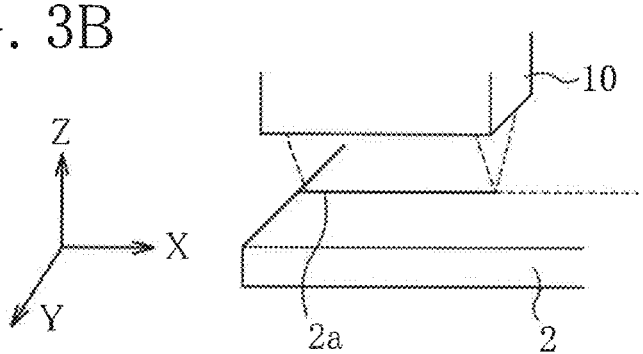
FIG. 3B illustrates a method of cutting a glass plate depicting the cutting process in time series.

Depending on the thickness of the glass 2, an initial crack 2a is developed on the glass 2 in about 15 to 30 seconds after irradiating the surface of the glass 2 with an infrared ray (FIG. 3B).

Figure 3C:
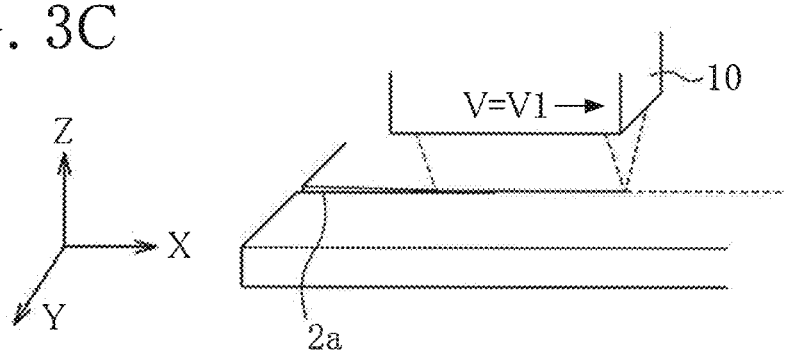
FIG. 3C illustrates a method of cutting a glass plate depicting the cutting process in time series.

Once the initial crack 2a is developed, the infrared line heater 10 is conveyed along the intended cut line L on the glass 2 by moving the first sliders 31 in the positive X direction along the conveyance rails 21 while emitting the infrared ray (FIG. 3C).

The conveyance rate V1 at this time is preferably 1 to 1.5 m/min. When the conveyance rate is slow, for example, about 0.2 to 0.5 m/min., heat may be retained at about several millimeters inside from the surface of the glass 2, resulting in development of a streak on a cut surface of the glass 2. A streak on a cut surface may not be an issue according to the standard defined in JIS R3202. Nonetheless, the rate is preferably 1 to 1.5 m/min. as described above to prevent the development of a streak if a higher quality is desired. However, the conveyance rate V1 needs to be less than the cutting speed.

An improved cutting speed can be appropriately obtained, for example, by increasing the output of the infrared line heater 10 per unit length, increasing the length of the infrared line heater 10, and the like. An increased output of the infrared line heater 10 per unit length can be achieved by increasing the diameter of a filament and the like. The output can be increased more easily and less expensively as compared with a laser and the like. Further, the shape of a heating element can easily be altered.

As the infrared line heater 10 is conveyed at the conveyance rate V1, the crack 2a of full body cutting continues to extend in the positive X direction as shown in FIG. 3C.

(The Reason Why Full Body Cutting is Feasible)

Full body cutting of the glass 2 along the intended cut line L can be effected as described above. This full body cutting can be achieved without performing the bend-breaking step.

The principle in which full body cutting of the glass 2 can be achieved without performing the bend-breaking step as described above may be postulated as follows.

The glass 2 is locally heated by converging irradiation with the infrared line heater 10, creating a temperature distribution in the glass 2.

Figure 4A:
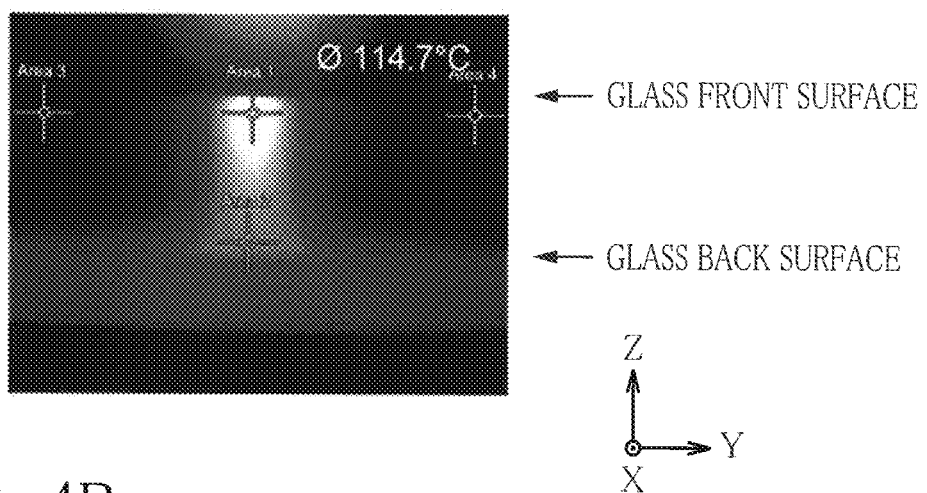
FIG. 4A represents photographs showing the temperature distribution across a cross-section of the glass plate in FIG. 3A and represents the temperature distribution in the direction of the plate thickness just before glass cutting.
Figure 4B:
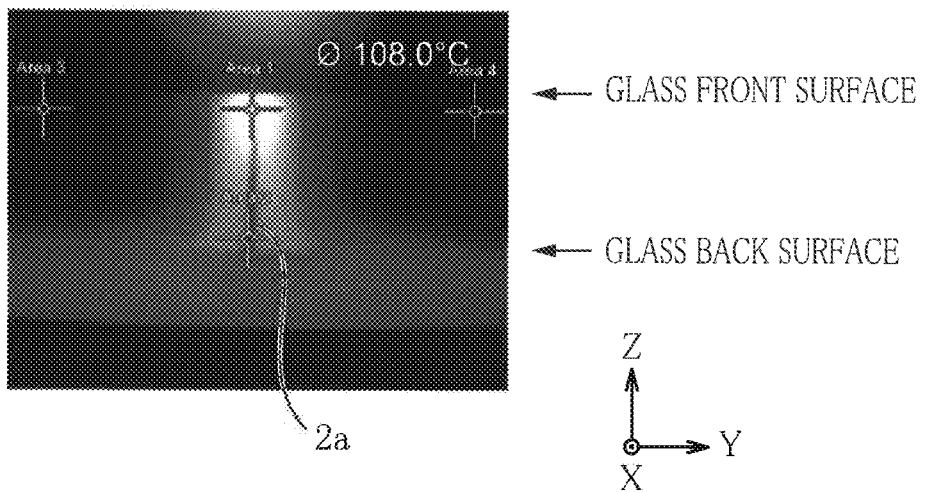
FIG. 4B represents photographs showing the temperature distribution across a cross-section of the glass plate in FIG. 3A and represents the temperature distribution in the direction of the plate thickness 0.1 second after from FIG. 4A and when the glass 2 is cut.

FIGS. 4A, and 4B represent photographs showing temperature distributions actually measured inside the glass 2 at a YZ section in the direction of the plate thickness. FIG. 4A represents a temperature distribution just before cutting the glass 2. FIG. 4B represents a temperature distribution 0.1 seconds after from FIG. 4A and when the glass 2 is cut.

Figure 5:
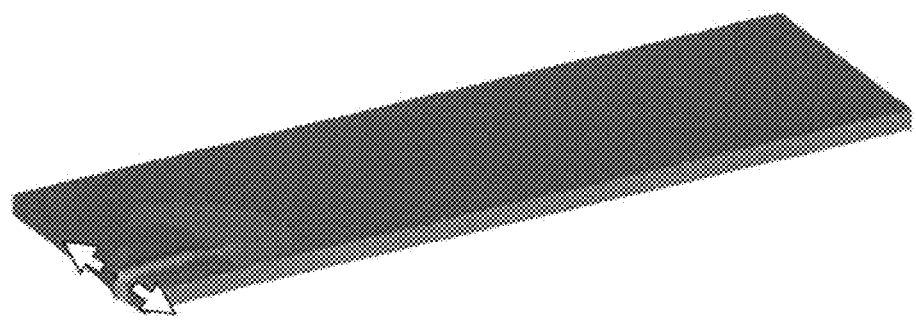
FIG. 5 illustrates the stress distribution generated in the glass plate at the temperature distribution shown in FIG. 4A.
Figure 5:
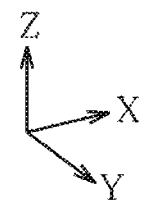
Figure 5:
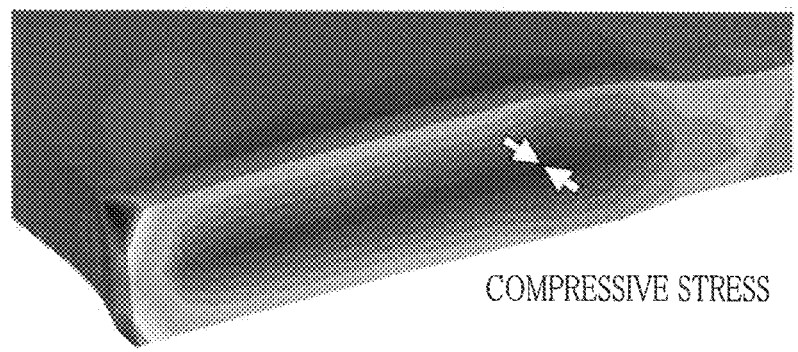

Further, FIG. 5 shows results from three-dimensional analysis of the stress field generated inside the glass 2 when the temperature distribution of FIG. 4A arises. The finite element method (FEM) was used.

As shown in FIG. 4A, a temperature gradient is developed inside the glass 2 heated with the infrared line heater 10. This temperature gradient induces a tensile stress of about 30 to 34 MPa in the Y axis direction at a surface layer and underlying layer of an edge on the intended cut line L as shown in FIG. 5.

When this tensile stress exceeds the break strength of an edge of the glass 2, the initial crack 2a is developed at the surface layer and underlying layer of that edge as the starting points.

Further, as shown in FIG. 5, the compressive stress is induced at this time around the end portion in the opposite side of the edge in regions being heated with the infrared line heaters 10 other than the edge of the glass 2.

The initial crack 2a induced at the front end of the intended cut line L on the glass 2 will extend to the vicinity of the end portion of the region being heated with the infrared line heater 10. Further, when the crack 2a reaches a region where the aforementioned compressive stress has been induced, the extension rate of the crack 2a begins to gradually decrease.

Then, a heated region is moved as the infrared line heater 10 is conveyed. Consequently, a region where the tensile stress is developed is also moved, and thus the crack continues to extend according to the conveyance rate.

Figure 3D:
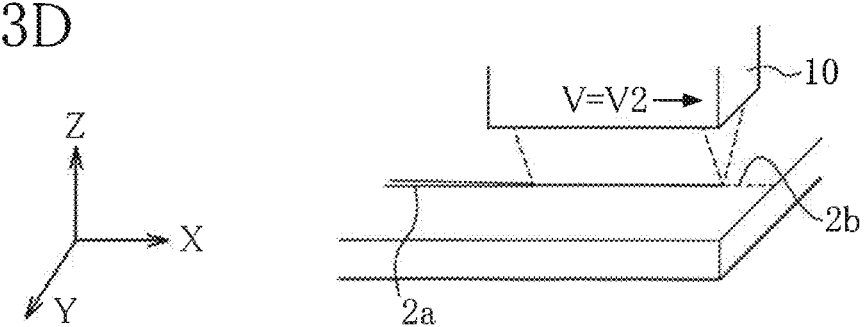
FIG. 3D illustrates a method of cutting a glass plate depicting the cutting process in time series.

Although full body cutting is possible in the present embodiment as described above, the cutting speed tends to be decreased when the crack 2a reaches the terminal region 2b at 4 to 5 cm from the end of the glass 2 as shown in FIG. 3D. This makes cutting difficult.

For this reason, in the present embodiment, the gas jetting device 40 blows compressed air over a region including the intended cut line L at the terminal region 2b.

Figure 6:
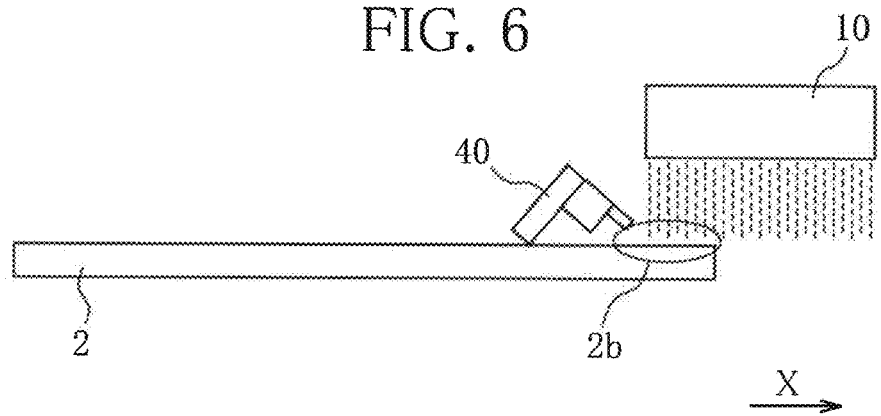
FIG. 6 illustrates a manner of blowing compressed air.
Figure 7:
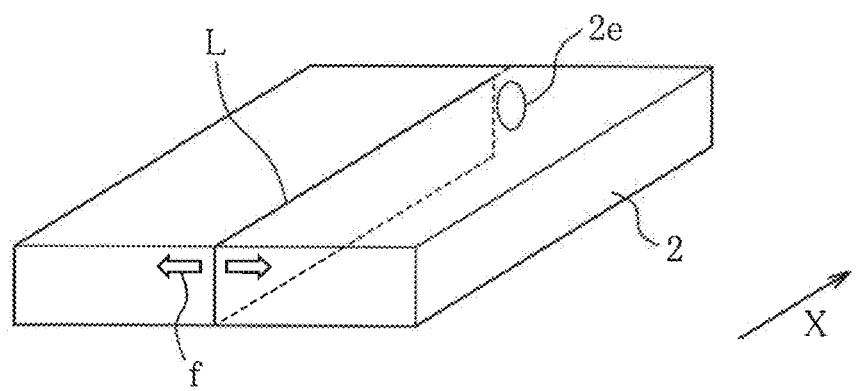
FIG. 7 illustrates dividing of a glass plate after blowing compressed air.
Figure 8:
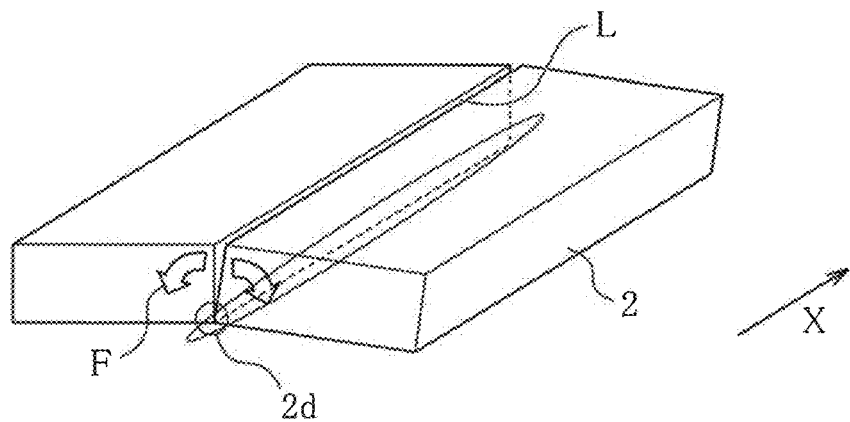
FIG. 8 illustrates bend-breaking as a comparative form.

FIG. 6 illustrates a manner of blowing compressed air. FIG. 7 illustrates a dividing of the glass 2 after blowing compressed air. FIG. 8 illustrates bend-breaking according to a comparative form.

Here, when compressed air is blown to extend the crack 2a, the crack 2a is formed only in the surface layers of the front and back surfaces of the glass at the terminal region 2b. That is, there is an uncut part 2e which is not full body cut at the terminal region 2b.

Further, at this time, a new crack may be developed from an edge on the intended cut line L to the negative X direction because the edge portion of the terminal region 2b is still under converged irradiation with the infrared line heater 10. Full body cutting may not be achieved when a crack is developed as described above. Nonetheless, this problem can be solved by blowing compressed air even in that case.

When compressed air is blown over the intended cut line L from the gas jetting device 40, the crack 2a extends only around the surface layer of the terminal region 2b of the glass 2, but not to the inside. The reason of this can be explained as follows.

Figure 9A:
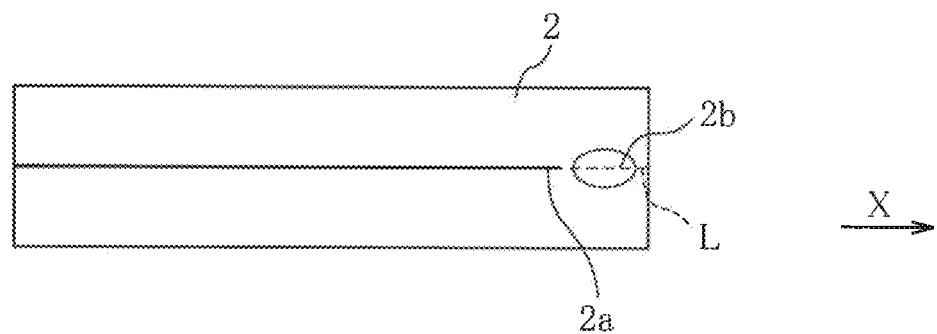
FIG. 9A represents a schematic view illustrating extension of a crack due to a jet of compressed air and shows a top view of the glass plate.
Figure 9B:
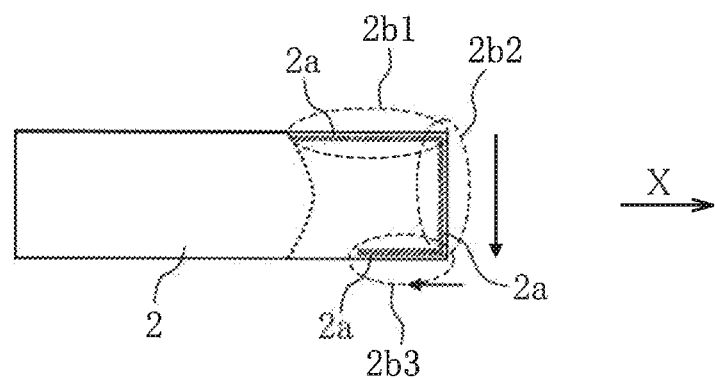
FIG. 9B represents a schematic view illustrating extension of a crack due to a jet of compressed air and shows a side view of the glass plate.

FIGS. 9A and 9B represent a schematic view illustrating extension of a crack due to a jet of compressed air. FIG. 9A shows a top view of the glass 2, and FIG. 9B shows a side view of the glass 2.

In the present embodiment, compressed air is blown from the gas jetting device 40 when the crack 2a extends to a position at about 50 mm from the end of the glass 2.

As shown in FIG. 9A, blowing is performed against the terminal region 2b ahead of the front end of the crack 2a. The terminal region 2b includes the intended cut line L within the range of the infrared irradiation.

As shown in FIG. 9B, a surface 2b1 in the surface of the glass 2 at the terminal region 2b irradiated with an infrared ray is blown with air, decreasing the temperature of the glass surface. As a result, a temperature difference arises between the surface and inside of the glass, and the tensile stress is induced on the surface of the glass to extend the crack 2a along the intended cut line L on the surface.

As the blown air flows around the glass 2, the crack 2a extends in a side 2b2 at the end of glass 2.

Further, as the air flows around to the back side of the glass 2, the crack 2a also extends in a back side 2b3 at the end of glass 2.

As described above, the crack 2a extends only around the surface layer in the terminal region 2b of glass 2, but does not reach the inside.

However, it can be then divided easily by opening a starting end region 2c outwardly with a small force f as shown in FIG. 7. This dividing operation can be performed even when the infrared line heater 10 is turned OFF. In that case, a portion which is not full body cut will remain in the terminal region 2b. Nonetheless, good cut surfaces can be obtained even when an external force is applied in the horizontal direction to open the glass. This can be explained as follows. The external force is applied in a direction to separate the cut surfaces of the glass 2 away from each other, preventing the glass edges from contacting each other. Therefore, microcracks, which may be generated when one glass edge is brought into contact with the other glass edge, tend to be less generated.

Further, the glass 2 is not completely divided until an external force is applied in the present embodiment and thus sliding and dropping of the glass 2 off from the mounting stages 22 may be prevented.

It is noted that in the present embodiment, an external force applied to the cracking front end of the glass 2 is a force applied in the horizontal direction to open the side of the initial crack 2a outwardly, i.e., a tensile stress. Therefore, this is a step different from the so-called bend-breaking in which a glass plate is bend-broken according to a mechanical approach by applying a bending stress F to the intended cut line L as shown in FIG. 8. In the case of the bend-breaking process as described above, glass edges at a lower surface 2d of the glass 2 are unavoidably brought into contact with each other, resulting in development of defects such as microcracks and chippings at the glass edges.

As described above, blowing compressed air over the intended cut line L using the gas jetting device 40 can accelerate the extension of the crack 2a at the terminal region 2b. This can also allow the conveyance rate V2 at the terminal region 2b to be the same as V1 or close to V1.

Then, when cutting of the glass 2 is completed, the infrared line heater 10 is turned OFF.

It is noted that a configuration where the gas jetting device 40 is attached is described in the present embodiment, but the present invention is not limited to this, and a structure in which the gas jetting device 40 is not provided may also be contemplated.

In that case, compressed air is not blown, but the conveyance rate V2 at the terminal region 2b is decreased below V1 when the end of the glass 2 is approached so that full body cutting is effected through the end of the glass 2. According to this approach, a time required for cutting is somewhat longer, but a similar defect-free cut surface can be obtained.

It is noted that the glass cut surfaces or the front and back surfaces at the terminal region 2b of the glass 2 may be pre-notched with a glass cutter instead of or in parallel with providing the gas jetting device 40.

Further, other portions other than the aforementioned terminal region 2b may be pre-notched as long as they are on the intended cut line L. For example, a portion in the negative X side of the glass 2 (the starting end region 2c where the infrared irradiation is started) may be lightly pre-notched. Even in a case as described above, the development of "cuttings" and "microcracks" can significantly be reduced because no bend-breaking step is involved.

Further, when the initial crack 2a is formed and allowed to extend, a portion away from the initial crack 2a may be irradiated with the infrared line heater 10 as long as it is on the intended cut line L. At that time, extension of the crack 2a is possible if the distance between the irradiated region and a glass edge where the initial crack 2a has been formed is about 30 mm or less.

Further, when the surface of the glass 2 at the starting end region 2c on the intended cut line L is pre-notched with a glass cutter and the like as described above, and then irradiated with the infrared line heater 10 to form the initial crack 2a, a position away from the formed notch may similarly be irradiated with the infrared line heater 10. At that time, formation of the initial crack 2a is possible if the distance between the irradiated region and a glass edge where the notch has been formed is about 30 mm or less. Even when the surface of the glass 2 is only lightly notched, the initial crack 2a can be allowed to extend throughout the entire plate thickness as long as the notch includes the glass edge.

It is noted that the glass 2 can be effectively cut without blowing compressed air and forming a notch. Blowing compressed air and forming a notch are optional steps. However, blowing compressed air and forming a notch can decrease a time required for forming the initial crack 2a and terminal crack, and likely provide higher effects with simple operations.

(Effect of First Embodiment)

According to the present embodiment, the glass 2, in particular, the thick glass plate 2 can be divided by full body cutting without via the bend-breaking step.

The glass cutting device 1 according to the present embodiment can perform rapid and precise cutting with simple operations of adjusting the output and converged position of the infrared line heater 10 and the conveyance rate of the infrared line heater 10.

Further, the present embodiment does not require formation of a scribe spanning the entire length formed on the intended cut line L. Moreover, the glass 2 is cut without performing bend-breaking, and thus cut glasses of the glass 2 do not make contact with each other. This can eliminate development of "microcracks" on the cut surfaces of the glass 2, preventing decrease in the edge strength.

Cullet is not be generated when cutting. This enables elimination of development of "cuttings" adhered on the cut surfaces and the surfaces of the glass 2. Moreover, the absence of "cuttings" can also reduce scratches on the glass surfaces.

Furthermore, the present invention can provide cut surfaces without cut-end defects ("splinter," "horned projection," "chipped cut-end," "shell-like chipping," "deviation from cut line," and the like).

Example of First Embodiment

Examples of the first embodiment in which cutting was performed with varied lengths, thicknesses and conveyance rates of the glass 2 will be described.

The conditions for cutting of the glass 2 with the glass cutting device 1 according to Examples 1 to 3 are shown in the following Table 1.

TABLE 1

| Example | Glass length (mm) | Plate thickness (mm) | Cutting time (Seconds) | Conveyance rate of glass (m/min.) | Presence or absence of glass edge notches Initially cracked portion | Presence or absence of compressed air |
|---|---|---|---|---|---|---|
| (1) | 1000 | 25 | 90 | 1~1.5 | No | Yes |
| (2) | 1000 | 25 | 65 | 1~1.5 | Yes | Yes |
| (3) | 1000 | 25 | 112 | 1~1.5 | No | No |

The glass 2 used in Examples is a soda lime glass plate (300 mm×1000 mm with a thickness of 25 mm).

The infrared line heater 10 is an infrared line heater (HYL25-28N from Hybec Corporation, Lamp length: 280 mm, Output: 1960 W, Focal distance: 25 mm).

The mounting stages 22 were metal plates (SUS304, SS400), and arranged at equal distance in the both sides from the intended cut line L.

Then, the infrared line heater 10 was attached to the flame 30, and allowed to manually scan along the X axis.

Example 1

First, the front end of the infrared line heater 10 was fixed after advanced for about 280 mm.

Then, concentrated irradiation was performed for about 30 seconds to induce the initial crack 2a. Next, the infrared line heater 10 was allowed to scan over about 60 seconds to extend the crack 2a on the intended cut line L.

Next, compressed air was blown over the surface of the glass 2 at the terminal portion 2b to induce the crack 2a from the front surface of the glass 2 through the back surface.

Next, the infrared line heater 10 was turned OFF, and then full body cutting was performed as follows. The glass in the side of the terminal region 2c was held in the hand, and the cut surfaces of the glass 2 were then pulled away in the horizontal direction and divided so that the cut surfaces became apart from each other.

Example 2

Figure 10:
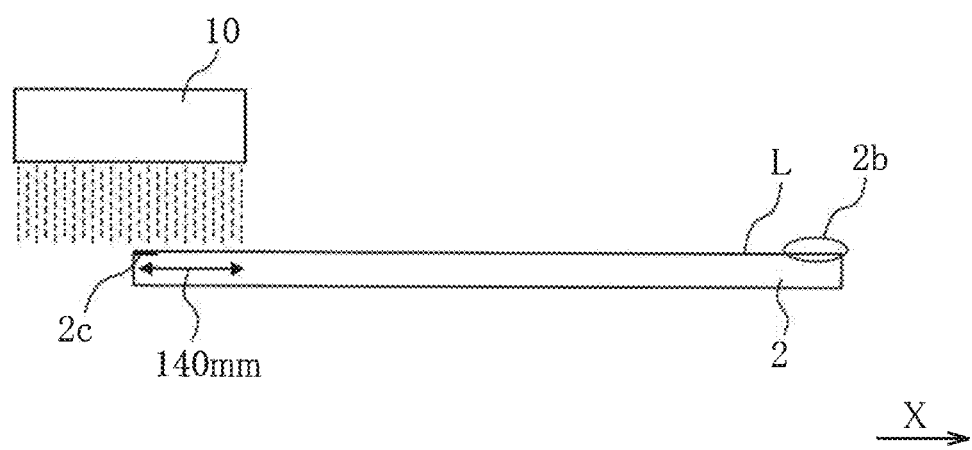
FIG. 10 illustrates cutting of a glass plate according to Example 2.

FIG. 10 illustrates cutting according to Example 2. In Example 2, the edge portion (glass cut surface) of the starting end region 2c on the intended cut line L was first lightly notched with a glass cutter.

Next, the front end of the infrared line heater 10 was fixed after advanced for about 140 mm as shown in the figure, and converged irradiation was then performed for about 12 seconds to extend the crack 2a to the irradiation area of the infrared line heater 10.

Next, the infrared line heater 10 was scanned over about 53 seconds, and compressed air was blown over the surface of glass 2 at the termination region 2b as in Example 1. Then, the glass 2 was pulled apart in the horizontal direction to perform full body cutting.

Example 3

Figure 11:
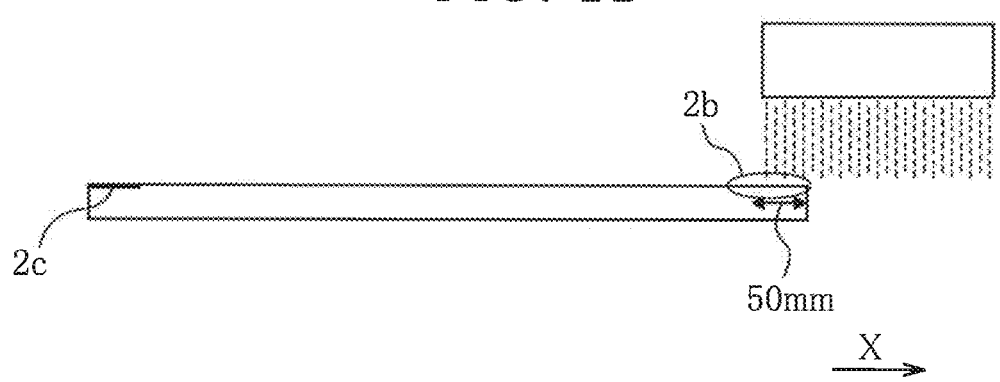
FIG. 11 illustrates cutting of a glass plate according to Example 3.

FIG. 11 illustrates cutting according to Example 3. As in Example 1, the front end of the infrared line heater 10 was fixed after advanced for about 280 mm, and converged irradiation was then performed for about 30 seconds to induce the initial crack 2a. Next, the infrared line heater 10 was scanned over about 60 seconds to extend the crack 2a on the intended cut line L.

Next, conveyance was stopped at the termination region 2b, and infrared irradiation was performed with the infrared line heater 10, and full body cutting was then performed.

FIG. 11 shows the positional reratioship between the infrared line heater 10 and the glass 2 when conveyance was stopped at the termination region 2b. As shown in the figure, the end of the infrared line heater 10 was located at 50 mm from the end of the glass 2 at the termination region 2b. It is noted that the positional relationship between the line heater and the glass plate when the first crack was induced is the same as that in Example 1.

According to the present Examples, the glass 2 was successfully full body cut without via the bend-breaking step in any of Examples 1, 2, and 3 and the cut surfaces were also good. Further, non-contact cutting was successful in Example 3. Moreover, in Examples 1 and 2 the non-contact cutting was included in the steps, but significant reduction of cutting time was able to be achieved.

Figure 12:
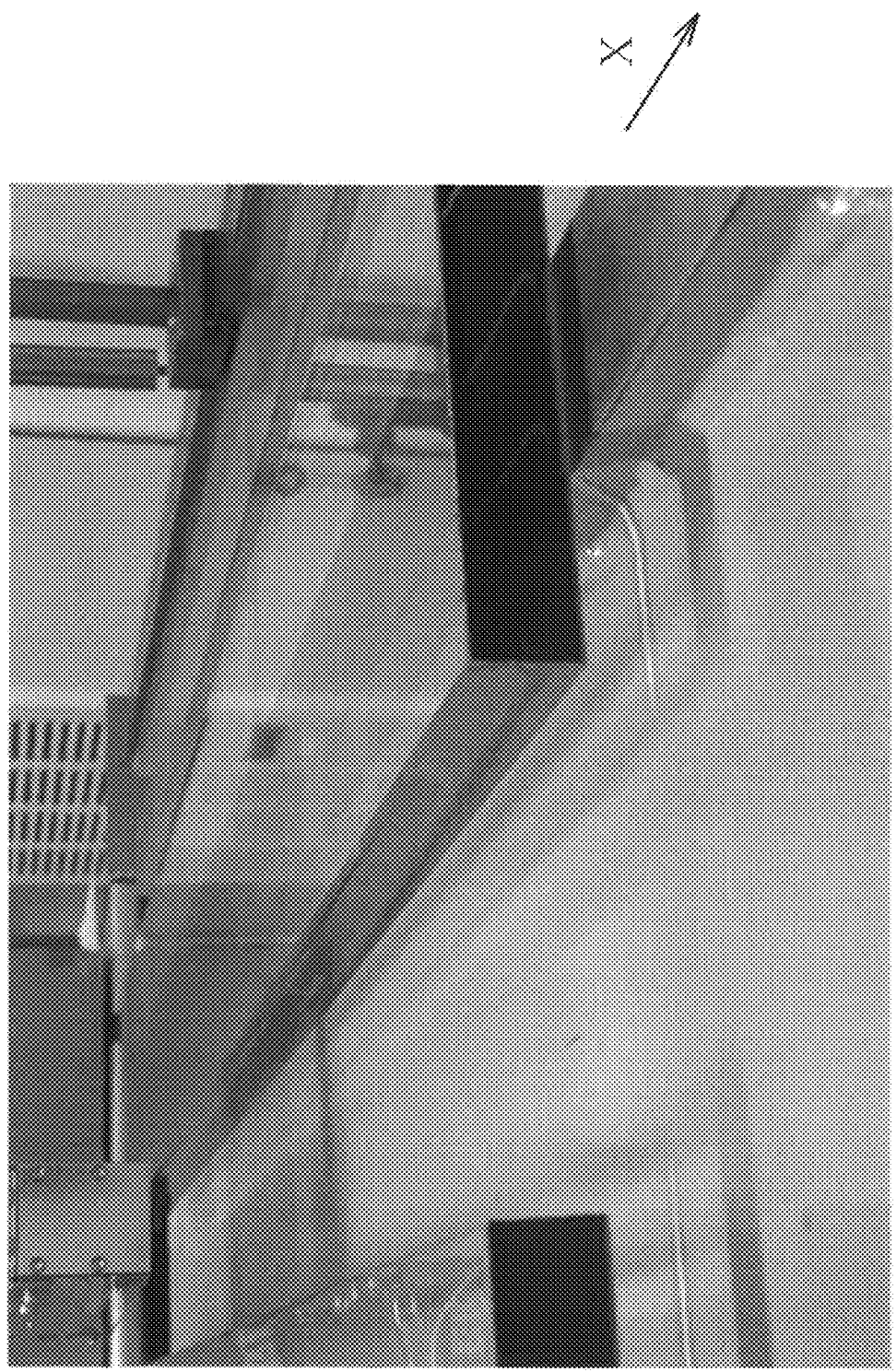
FIG. 12 shows a photograph of the cut surfaces of cut glass plates.

FIG. 12 shows a photograph of the cut surfaces of the glass plate which was cut. As shown in the photograph, the cut surfaces of the glass plate which was cut according to the present approach show excellent straightness and right-angleness, and further show no cut-end defects even if it is a thick glass plate. Therefore, no additional adjustment is needed in the subsequent steps.

(Variations of First Embodiment)

One infrared line heater 10 was used in the first embodiment, but the configuration is also not limited to this. Two or more of the infrared line heater 10 may be used.

The infrared line heater 10 was arranged over the glass 2, but the configuration is not limited to this. The infrared line heater 10 may be arranged under the mounting stages 22, or may be arranged both over the glass 2 and under the mounting stages 22.

Further, when all the steps are performed in a non-contact manner using the glass cutting device 1 according to the present invention, the glass 2 is divided only by means of irradiation of converged infrared light as described above. This dividing is effected by a strong tensile stress generated on the intended cut line L, and thus in some cases, divided glass plates of the glass 2 may slide over the mounting stages 22 such that the cut surfaces becomes separated apart from each other.

If this occurs, the divided glass plates of the glass 2 may fall off the mounting stages 22, depending on the size of the mounting stages 22. Therefore, an auxiliary member for preventing the fall may be provided.

The auxiliary member may be provided on the mounting stages 22, or may be provided separately from the mounting stages 22 as long as it can prevent the glass 2 from falling. Further, the auxiliary member may be already in contact with the glass 2 before cutting, or may be provided so as to make contact with the cut plates of the glass 2 when they slide over the mounting stages 22.

It is noted that when compressed air is blown over the terminal region 2b as described above, the final dividing operation can be performed with a weak force f, reducing the risk of sliding and falling and the like.

Second Embodiment

Next, the second embodiment of the present invention will be described.

Figure 13:
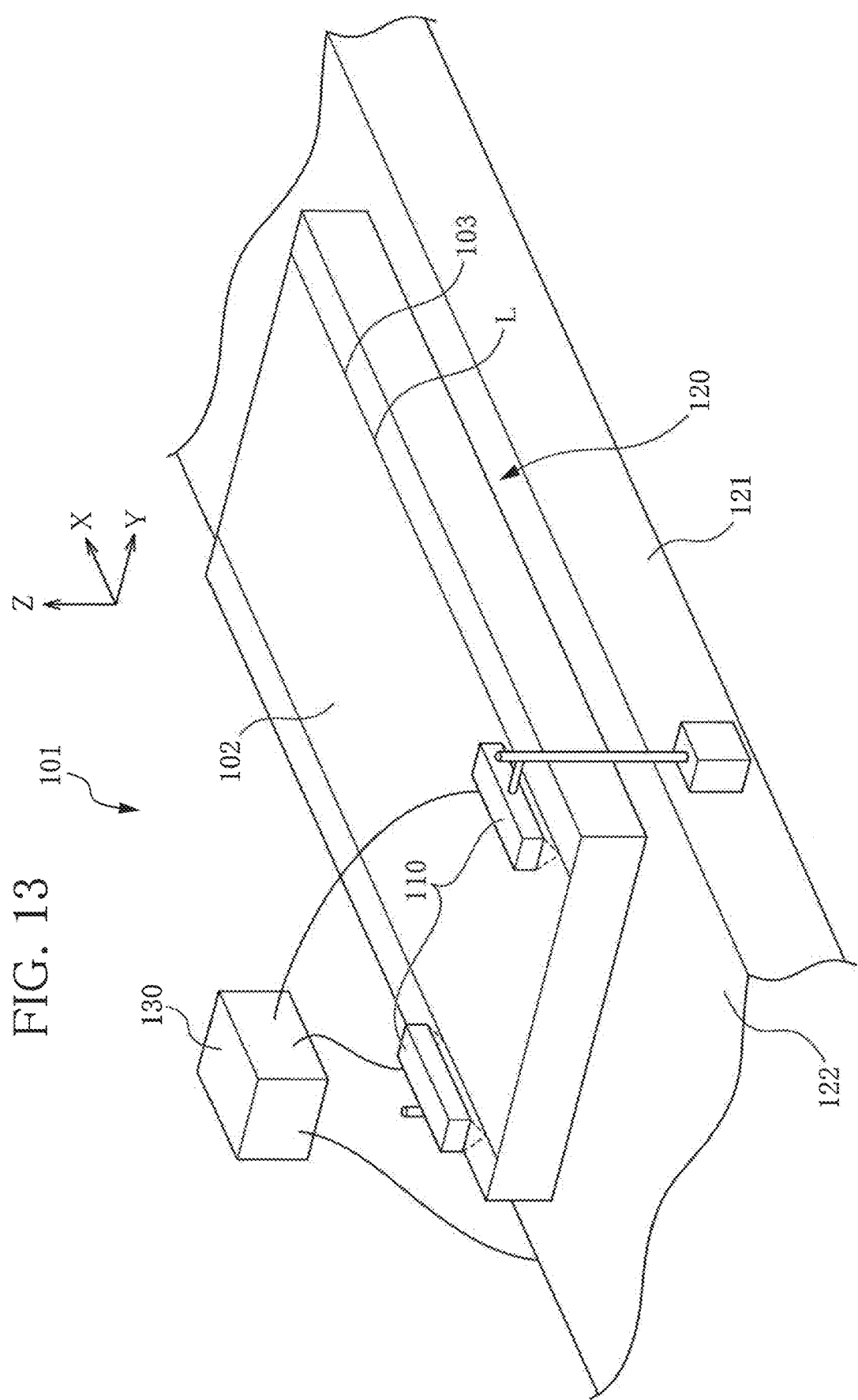
FIG. 13 shows a schematic view of a glass cutting apparatus with a glass plate in place.

FIG. 13 shows a schematic view of a glass cutting device 101 with a glass 102 in place.

In the present embodiment, the conveyance direction of the glass 102 is designated as the negative X direction, and the horizontal direction perpendicular to the X direction is designated as the Y direction, and the thickness direction of the glass 102 is designated as the Z direction for descriptions below.

(Description of Apparatus)

As shown in FIG. 13, the glass cutting device 101 includes two infrared line heaters 110, a conveyance stage 120 for conveying the glass 102, and a control unit 130.

(Infrared Line Heaters 110)

The infrared line heaters 110 are similarly configured as in the first embodiment, and thus their description will be omitted.

(Conveyance Stage 120)

In the present embodiment, the conveyance stage 120 may be a belt-type conveyance stage in which an annular wide belt 122 spans the rotary rollers (not shown). An outer frame 121 is arranged at the outsides of the belt 122 in the width direction.

It is noted that the belt 122, which will be exposed to infrared rays, is preferably made of a heat-resistant material. Further, direct heating of the mounting stage with infrared rays may be prevented by arranging a heat insulating material such as glass wool on a surface which makes contact with a portion of the glass 102 to be cut.

(Control Unit 130)

The control unit 130 controls start, stop, and speed adjustment of conveyance of the conveyance stage 120, ON/OFF of the infrared line heater 110, adjustment of the vertical positions of the infrared line heaters 110, and the like according to the operator's operation.

(Glass 102)

The target brittle material for cutting with the present cutting apparatus is a plate-like glass 102, which is similar to the glass 2 used in the first embodiment. Description thereof is therefore omitted.

(Arrangement of Infrared Line Heater 110)

In the present embodiment, the infrared line heaters 110 of the glass cutting device 101 are arranged at the ends of the glass 102 in the width direction (the Y direction) as shown in FIG. 13, and will be used for the so-called edge cutting process.

However, the cutting apparatus according to the present embodiment is not necessarily limited to the edge cutting process. It can be used for other purposes other than the edge cutting. For example, it can also be used for dividing a glass plate into a desired size as in product cutting.

(Method of Cutting)

Next, the method of cutting the glass 102 according to the embodiment will be described. FIG. 14A to 14D illustrate the method of cutting. FIG. 14A to 14D sequentially depict the cutting process. The method of cutting the glass 102 according to the second embodiment is substantially similar to that according to the first embodiment, but it differs in that the infrared line heater 10 is moved in the first embodiment while the glass 102 is moved instead of the infrared line heater 10 in the second embodiment.

First, the glass 102 to be cut is placed on the conveyance stage 120. Then, the glass 102 is moved so that the positions of the ends thereof substantially coincide with the ends of the irradiation areas of the infrared line heaters 110.

As in the first embodiment, the positions of the infrared line heaters 110 in the height direction are adjusted depending on the thickness of the glass 102 so that the widths of infrared rays emitted from the infrared line heaters 110 become a desired width (3 mm in the present embodiment).

The infrared line heater 110 is turned ON. At that time, the glass 201 is not yet conveyed, but remains standing still (V=0) (FIG. 14A) in the present embodiment.

Figure 14A:
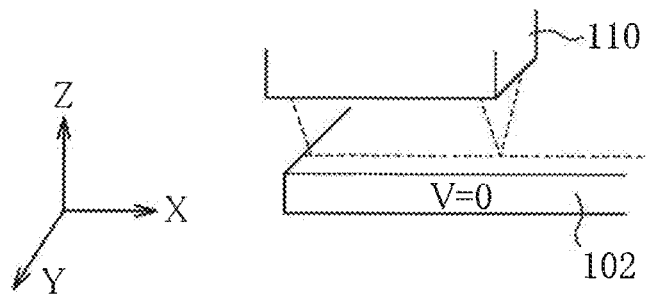
FIG. 14A illustrates a method of cutting a glass plate and depicts depict the cutting process in time series.
Figure 14B:
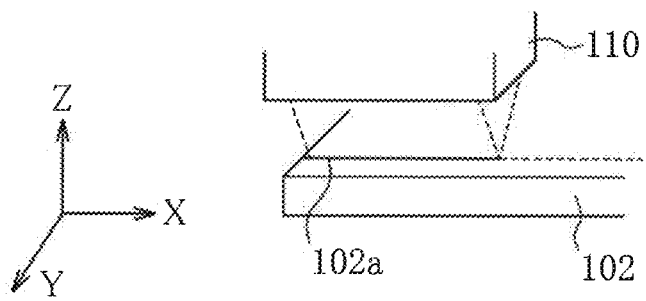
FIG. 14B illustrates a method of cutting a glass plate and depicts depict the cutting process in time series.

Depending on the thickness of the glass 102, an initial crack 102a is developed in the glass 102 in about 15 to 30 seconds after irradiating the surface of the glass 102 with an infrared ray (FIG. 14B).

Figure 14C:
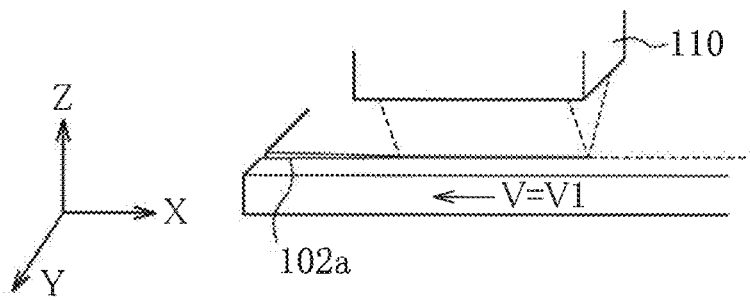
FIG. 14C illustrates a method of cutting a glass plate and depicts depict the cutting process in time series.

Once the initial crack 102a is developed, the conveyance stage 120 is actuated to convey the glass 102 along the intended cut line L while emitting the infrared ray (FIG. 14C).

The conveyance rate V1 at this time is preferably 1 to 1.5 m/min. for similar reasons as in the first embodiment.

As the glass 102 is conveyed at the conveyance rate V1, the crack 102a of full body cutting continues to extend in the conveyance direction of the glass 102 as shown in FIG. 14C.

Figure 14D:
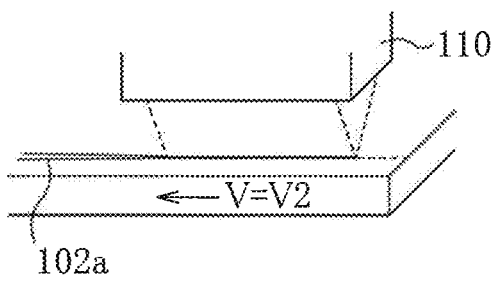
FIG. 14D illustrates a method of cutting a glass plate and depicts depict the cutting process in time series.

However, the cutting speed tends to be decreased when the crack 102a reaches a portion about 1 to 2 cm from the end of the glass 102 as shown in FIG. 14D. This makes cutting difficult.

For this reason, when the end of glass 102 is approached, the conveyance rate V is changed to a rate V2 which is slower than V1 so that full body cutting can be achieved.

Further, when the front surface or back surface of the glass, or the both are cooled with compressed air and the like at this time, a terminal crack may easily be formed.

Then, once cutting of the glass 102 is completed, the line infrared line heater 110 is turned OFF.

According to the present embodiment, full body cutting of the glass 102 along the intended cut line L throughout the entire length can be achieved as in the first embodiment.

The initial crack 102a generated at the front end of the intended cut line L of the glass 102 continues to extend to the end portion of a region heated with the infrared line heater 110. Further, once the crack reaches a region where the compressive stress as described above has been induced, the extension rate of the crack begins to gradually decrease.

Then, the heated region is moved as the glass 102 is conveyed, and the region where a stress is generated is also moved accordingly. Consequently, the crack continues to extend depending on the conveyance rate.

As described above, the present embodiment can also provide similar effects as in the first embodiment.

Example of Second Embodiment

Examples of the second embodiment in which the glass 102 was cut with varied lengths, thicknesses, and conveyance rates of the glass 102 will be described.

The line infrared line heater 110 used is similar to that used in Examples of the first embodiment.

The lengths, thicknesses, conveyance rates, and cutting results of the glass 102 used are shown in Table 3. The type of the glass 102 is a plate-like float glass.

TABLE 2

| Example | Glass length (mm) | Plate thickness (mm) | Cutting time (Seconds) | Conveyance rate of glass (m/min.) | Remarks |
|---|---|---|---|---|---|
| (4) | 300 | 15 | 41 | 1~1.5 | Cutting successful |
| (5) | 300 | 25 | 58 | 1~1.5 | Cutting successful |
| (6) | 1000 | 15 | 82 | 1~1.5 | Cutting successful with good cut surface. |
| (7) | 1000 | 19 | 84 | 1~1.5 | Cutting successful with good cut surface. |
| (8) | 1000 | 25 | 86 | 1~1.5 | Cutting successful with good cut surface. |
| (9) | 1000 | 19 | 525 | 0.2 | Cutting successful with streak developed |
| (10) | 1000 | 19 | 146 | 0.5 | Cutting successful with streak developed |

As shown in Table 3, according to these Examples, full body cutting of the glass 102 was successful in a non-contact manner without via the bend-breaking step in any of Examples (4) to (10) shown in the table.

Below, each of Examples will be described in detail.

In Examples (4) and (5), the length and conveyance rate of the glass 102 are the same while the thicknesses of the glass 102 are different. The cutting time (a time from power ON to the complication of cutting) was longer in Example (5) where the plate thickness was 25 mm than in Example (4) where the plate thickness was 15 mm. Nonetheless, cutting was successful in the both cases.

Also in Examples (6) and (8), the length and conveyance rate of the glass 102 are the same while the thicknesses of the glass 102 are different. In any of these cases, cutting was successful, and the cut surfaces were also good.

In Examples (7), (9), and (10), the length and thickness of the glass 102 are the same while the conveyance rates are different.

In Example (7) where the conveyance rate was 1 to 1.5 m/min., no streak was developed on a cut surface, but in Example (10) where the conveyance rate was 0.5 m/min., a streak was developed on a cut surface.

A streak on a cut surface may not be an issue according to the standard defined in JIS R3202 as described above, but a conveyance rate of 1 to 1.5 m/min. is found to be more suitable according to these results.

Next, results from measurement of the strength of a cut surface of a cut glass 102A which has been cut according to the present embodiment will be described.

A glass 102 with a thickness of 19 mm was cut by the method of cutting according to the present embodiment to prepare a test piece (25 mm×100 mm). This test piece was subjected to the four-point bending test in accordance with the method described in JIS R1601 (1995) "the bending test method for fine ceramics."

A Tensilon universal testing machine (RTC-2410, Orientec Co., Ltd.) is used.

Loading span (=the width of a pressurizing jig) is 60 mm.

Supporting Span (=the width of a supporting jig) is 180 mm.

Test speed is 1 ram/min.

The arithmetic mean of obtained results is computed to obtain the mean value of breaking stress. Results are shown below.

TABLE 3

| | Example | | Comparative Example | |
|---|---|---|---|---|
| | Evaluated side | | | |
| | TOP (Surface of incoming Infrared) | BOTTOM (Surface of exiting infrared) | TOP (Cutter Surface) | BOTTOM (Clean cut surface) |
| Mean breaking strength (MPa) | 109 | 83 | 50 | 72 |

It is noted that a test piece as a comparative form is a so-called clean cut sample which was prepared as follows: a skilled worker introduced a scribe line on the surface of the intended cut line L with a superhard tool blade (cutter), and applied a bending force in the direction orthogonal to the scribe line to perform bend-breaking into a size of 100 mm×400 mm. The comparison may not be accurate because their sizes were different. Nonetheless, the cut glass 102A from the present embodiment showed a mean break strength of 109 MPa at the top and 83 MPa at the bottom. In contrast, the comparative form showed a mean break strength of 50 MPa at the top and 72 MPa at the bottom.

As described above, the cut glass 102A according to the present example showed superior edge strength which was stronger by about 2 times at the TOP surface side and about 1.15 times at the BOTTOM surface side than the clean cut glass prepared via bend-breaking by a skilled worker.

Figure 15A:
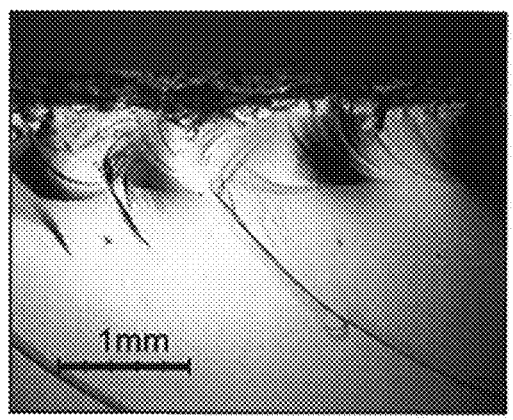
FIG. 15A shows results from observation of a cut surface of a glass plate cut by the method of cutting according to the present embodiment under a light microscope and represents a glass plate conventionally obtained after bend-breaking according to the conventional method.

The cut surface of the cut glass 102A which was cut by the method of cutting according to the present embodiment was observed under a light microscope. Results are shown in FIG. 15. In FIG. 15A shows the conventional cut glass subjected to conventional bend-breaking performed by a skilled work, and FIG. 15B shows a cut surface of the cut glass 102A which was cut according to the present embodiment.

As shown in FIG. 15A, microcracks due to cutter scratches are seen on the cut surface of the conventional cut glass.

Figure 15B:
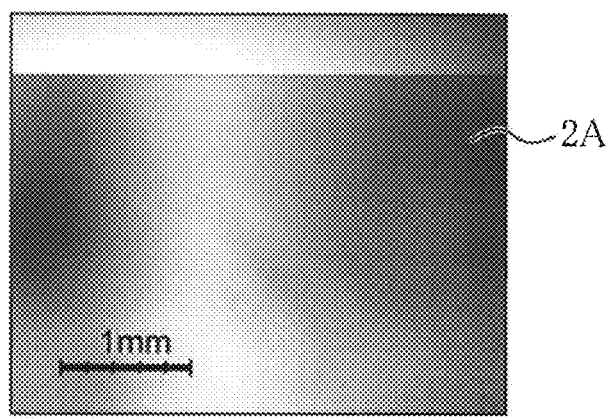
FIG. 15B shows results from observation of a cut surface of a glass plate cut by the method of cutting according to the present embodiment under a light microscope and (b) represents a cut surface of a glass plate cut by the method according to the present embodiment.

However, according to the present embodiment as shown in F FIG. 15B, microcracks, cut-end defects, and the like are not developed on the cut surface of the cut glass 102A. That is, a clean cut surface as if it were cut with a sharp blade was obtained. Further, the ridgeline of the cut surface of the cut glass 102A according to the present embodiment shown in FIG. 15B was sharp, but the finger was traced on the ridgeline without any cut wound on the finger. This reflects that no microcrack has been developed on the cut surface, and no minute unevenness has been formed at the ridgeline of the glass 102.

When the method of cutting via the conventional bend-breaking step is used for edge cutting of a thick glass plate, a reserving space for cutting of a certain width is required at the sides to be separated (a reserving space for cutting of about 300 mm in width is required at the both sides (a total of 600 mm)). Otherwise, the cut line may be bent, resulting in a poor result.

However, the present embodiment does not require the bend-breaking step, and thus a smaller width can be used for edge cutting. Therefore, a product larger than the traditional size can be handled.

Specifically, cutting can be performed with a reserving space for cutting comparable to the plate thickness (a width of 25 mm for a 25 mm thick glass).

Figure 16:
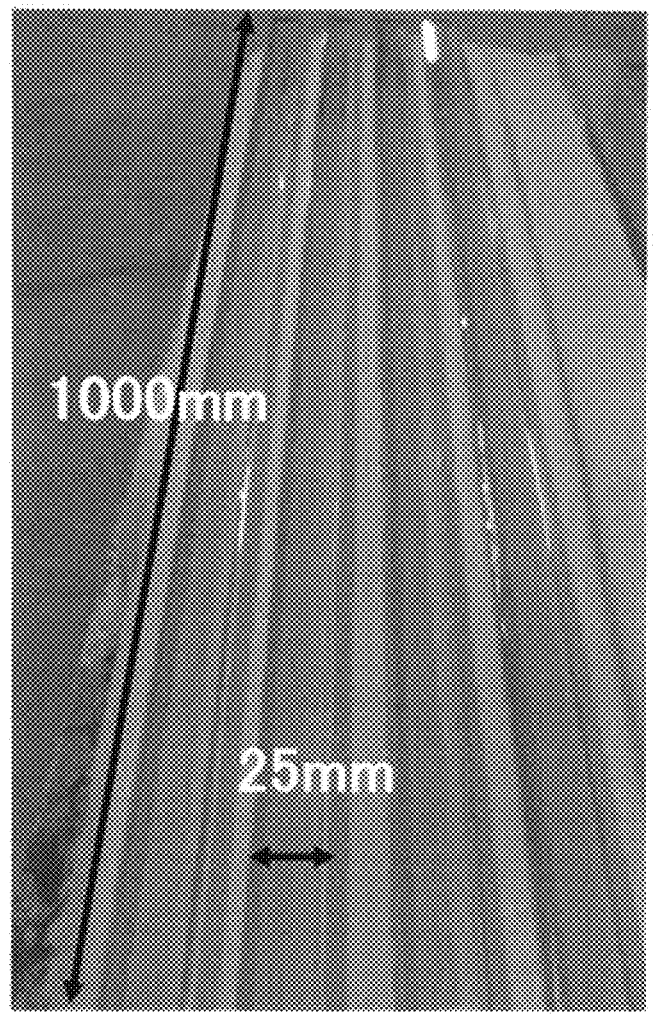
FIG. 16 represents a photographic form of a drawing of glass plates in which a float glass plate of 1000 mm in length, 100 mm in width, and 25 mm in thickness was divided into 4 pieces each having a width of 25 mm. The photograph was taken from the top.

FIG. 16 shows a photograph of glass plates which are cut with a reserving space for cutting of 25 mm in width for a 25 mm thick glass. Thus, a region which can be used as a product will increase. This is very advantageous in terms of cost.

Figure 17:
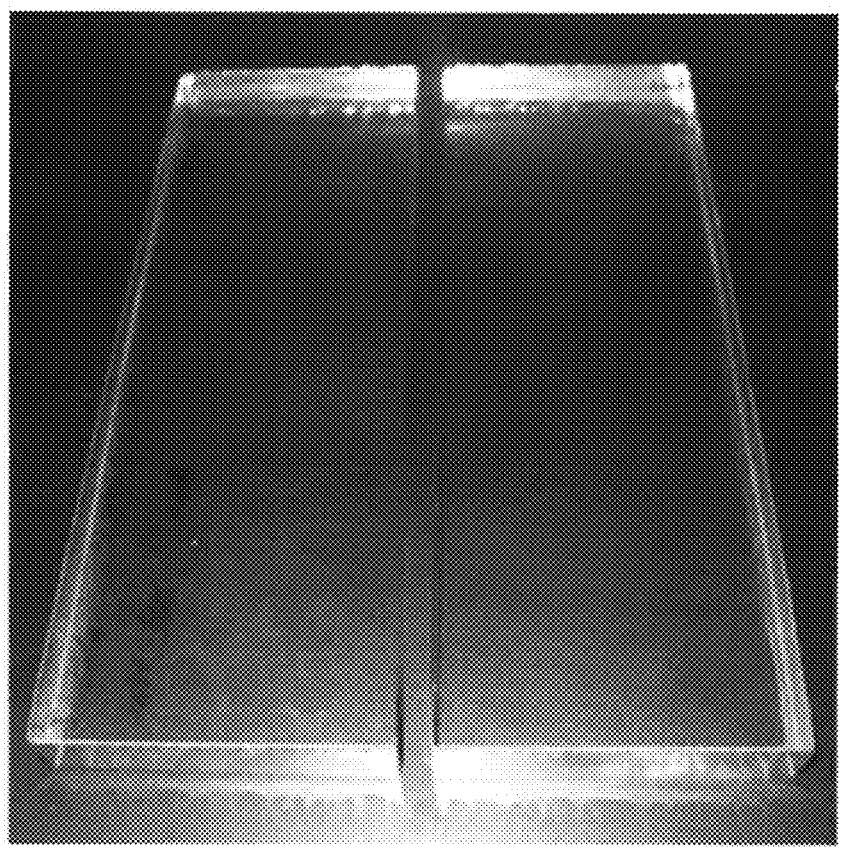
FIG. 17 represents a photographic form of a drawing of glass plates in which a float glass plate of 300 mm in length, 250 mm in width, and 25 mm in thickness was divided into 2 pieces each having a width of 125 mm. The photograph was taken from the top.
Figure 18:
FIG. 18 represents a photographic form of a drawing of glass plates in which a float glass plate of 300 mm in length, 250 mm in width, and 25 mm in thickness was divided into 2 pieces each having a width of 125 mm. The photograph was taken from the top.

FIGS. 17 and 18 show photographs of the cut surfaces of the glass plates which are cut. As shown in the photographs, the cut surfaces of the glass plate which is cut according to the present approach show excellent straightness and right-angleness, and further show no cut-end faults even if it is a thick glass plate. Therefore, no additional adjustment is needed in the subsequent steps.

(Variations of Second Embodiment)

It is noted that in the present embodiment, the infrared line heater 110 was turned ON at a speed of the glass 102 of V=0 in a state where the position of the end of the glass 102 substantially coincides with the end of irradiation area of the infrared line heater 110 as described with reference to FIG. 14.

However, the procedure is not limited to this. The infrared line heater 110 may be turned ON, and conveyance of the glass 102 may be started before the position of the end of the glass 102 reaches the end of the irradiation area of the infrared line heater 110. The conveyance rate may be V1 for constant-rate conveyance, or may be slower than V1 and then changed to V1 when the initial crack 102a is developed.

Further, according to the approach according to the present invention, a crack developed in the glass 102 can be extended by irradiation with the infrared line heater 110. Accordingly, in order to decrease a time required for generating the initial crack a, a scribed line and the like may be pre-introduced into a edge surface or a cut surface by any method, which may be used as the initial crack 102a to extend a crack. According to the above method, at least one step may not be of non-contact cutting, depending the way of introducing the initial crack a. However, development of "cuttings" and "microcracks" can significantly be reduced by virtue of the absence of the bend-breaking step.

Further, two line infrared line heaters 110 were used in the present embodiment, but the number is not limited to this. One line infrared line heater 110 may be used, or three or more infrared line heaters 110 may be used.

The conveyance stage 120 is not limited to a belt-type, but it may be a device including an outer frame extending in the X direction, and multiple rollers arranged so that the longitudinal direction relative to the outer frame thereof is along the Y direction, thereby moving a load loaded on the rollers.

Further, the conveyance stage itself may not be moved, but the glass 102 may be manually moved on the conveyance stage. In that case, heat damage on the conveyance stage can be prevented. The heat damage may be caused when the line infrared line heater 110 over the conveyance stage bores a hole in an irritated position, allowing an infrared ray to reach the conveyance stage.

The infrared line heater 110 can be arranged under the conveyance stage 120, or may be arranged both thereover and thereunder as in the first embodiment.

Further, an auxiliary member for preventing a fall may be pre-provided as in the first embodiment.

EXPLANATION OF REFERENCE NUMERALS 1, 101: Glass cutting device, 2, 102: Glass, 2a, 102a: Crack, 2a: Initial crack, 2b: Termination region, 2c: Starting end region, 10, 110: Infrared line heater, 20: Fixing platform, 21: conveyance rail, 22: Mounting stage, 25: Heater supporting plate, 30: Flame, 32: Lifting and lowering mechanism, 35: Heater supporting plate, 40: Gas jetting device, 50, 130: Control unit, 102A: Cut glass, 103: Infrared absorption layer, 120: Conveyance stage, 121: Outer frame

The invention claimed is:

1. A method of cutting a glass plate, the method comprising:
   a conveyance cutting step having a first step of converging and irradiating a near-infrared ray on a surface of a glass plate of soda lime silicate with a thickness of 2 to 25 mm linearly along an intended cut line using a near-infrared line heater while moving at a first speed the near-infrared line heater relative to the glass plate in a direction along the intended cut line in a state where a portion immediately beneath the intended cut line in a lower surface of the glass plate is exposed to air, thereby extending an initial crack throughout an entire glass plate thickness induced at a front end of the intended cut line of the glass plate to a position short of a terminal region of the glass plate along the intended cut line,
   wherein the first step is performed by moving the near-infrared line heater relative to the glass plate in a direction along the intended cut line, without blowing gas or water; and
   wherein the conveyance cutting step comprises a cooling step of jetting a fluid ahead of a front end of the crack to cool the terminal region for cutting in the glass plate, allowing the crack to extend on a front surface of the glass plate on the intended cut line, to subsequently extend in a side at an end of the glass plate, and to further extend in a back surface at the end of the glass plate when cuttinq the terminal region after the first step.

2. The method of cutting a glass plate according to claim 1, further comprising
   before the conveyance cutting step,
   a notching step of notching the glass plate, at a starting end region for the cutting of the glass plate along the line on the glass plate.

3. The method of cutting a glass plate according to claim 1, further comprising
   before performing the conveyance cutting step,
   an initial crack-inducing step of converging and irradiating the near-infrared ray to the glass plate, linearly at a speed slower than the first speed in the conveyance cutting step the glass plate in the direction along the intended cut line or after stopping the glass plate.

4. The method of cutting a glass plate according to claim 1, further comprising
   after the conveyance cutting step,
   a terminal crack-inducing step of converging and irradiating the near-infrared ray to the glass plate linearly at a speed slower than the first speed in the conveyance cutting step of the glass plate in the direction along the intended cut line or after stopping the glass plate.

* * * * *